United States Patent
Fleureau et al.

(10) Patent No.: US 10,412,202 B2
(45) Date of Patent: Sep. 10, 2019

(54) METHOD AND DEVICE FOR ENCODING/DECODING A PACKET COMPRISING DATA REPRESENTATIVE OF A HAPTIC EFFECT

(71) Applicant: THOMSON LICENSING, Issy les Moulineaux (FR)

(72) Inventors: Julien Fleureau, Rennes (FR); Bertrand Leroy, Bruz (FR); Franck Thudor, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 274 days.

(21) Appl. No.: 15/161,259

(22) Filed: May 22, 2016

(65) Prior Publication Data
US 2016/0352872 A1      Dec. 1, 2016

(30) Foreign Application Priority Data
May 26, 2015   (EP) ..................................... 15305789

(51) Int. Cl.
*H04L 29/06* (2006.01)
*G06F 3/01* (2006.01)
*G08B 6/00* (2006.01)
*H04L 5/00* (2006.01)

(52) U.S. Cl.
CPC .............. *H04L 69/22* (2013.01); *G06F 3/011* (2013.01); *G06F 3/016* (2013.01); *G06F 3/017* (2013.01); *G08B 6/00* (2013.01); *H04L 5/0044* (2013.01); *H04L 65/607* (2013.01)

(58) Field of Classification Search
None
See application file for complete search history.

(56) References Cited

U.S. PATENT DOCUMENTS

| | | | | |
|---|---|---|---|---|
| 8,243,099 | B2 * | 8/2012 | Ryu | G06F 3/016 340/407.1 |
| 8,540,571 | B2 * | 9/2013 | Grant | G06F 3/011 345/156 |
| 9,019,087 | B2 * | 4/2015 | Bakircioglu | H04N 9/8205 340/407.1 |
| 9,091,087 | B2 * | 7/2015 | Watford | E06C 1/28 |
| 9,108,106 | B2 * | 8/2015 | Han | A63F 13/10 |
| 9,128,520 | B2 * | 9/2015 | Geisner | G06T 19/006 |
| 9,374,087 | B2 * | 6/2016 | Han | G06F 3/011 |
| 2007/0126927 | A1 * | 6/2007 | Yun | A63J 5/00 348/473 |

(Continued)

FOREIGN PATENT DOCUMENTS

WO    WO2005048541    5/2005

*Primary Examiner* — Chirag G Shah
*Assistant Examiner* — Suk Jin Kang
(74) *Attorney, Agent, or Firm* — Tutunjian & Bitetto, P.C.

(57) ABSTRACT

A method of encoding a packet of data representative of a haptic effect, the haptic affect being associated with an immersive content is described. The method includes adding a first information in the packet, the first information being representative of a dependency of said haptic effect with regard to a position of a body model in relation to the immersive content. Thereafter, a second information in the packet is added, the second information being representative of at least a first part of the body model targeted by the haptic effect. A method for decoding the packet and corresponding devices are also described.

14 Claims, 6 Drawing Sheets

(56) References Cited

U.S. PATENT DOCUMENTS

| | | | |
|---|---|---|---|
| 2008/0223627 A1* | 9/2008 | Lacroix | G06F 3/016 178/18.01 |
| 2009/0096632 A1* | 4/2009 | Ullrich | H04N 9/8205 340/4.21 |
| 2011/0060599 A1* | 3/2011 | Kim | H04S 7/30 704/501 |
| 2012/0058824 A1* | 3/2012 | Raptis | A63F 13/213 463/36 |
| 2012/0092286 A1* | 4/2012 | O'Prey | G06F 3/0416 345/174 |
| 2012/0165098 A1* | 6/2012 | Raptis | A63F 13/213 463/36 |
| 2012/0235899 A1* | 9/2012 | Han | G06F 3/017 345/156 |
| 2013/0227410 A1* | 8/2013 | Sridhara | H04N 21/235 715/702 |
| 2013/0300740 A1* | 11/2013 | Snyder | G06F 3/016 345/420 |
| 2014/0125467 A1* | 5/2014 | Da Costa | G06F 3/016 340/407.1 |
| 2014/0267076 A1* | 9/2014 | Birnbaum | B25J 13/025 345/173 |
| 2014/0282270 A1* | 9/2014 | Slonneger | G06F 3/017 715/863 |
| 2014/0347176 A1* | 11/2014 | Modarres | G06F 3/016 340/407.1 |
| 2015/0077324 A1* | 3/2015 | Birnbaum | G06F 3/016 345/156 |
| 2015/0102918 A1* | 4/2015 | Da Costa | G06F 3/016 340/407.1 |
| 2015/0154966 A1* | 6/2015 | Bharitkar | G10L 19/008 381/23 |
| 2015/0338204 A1* | 11/2015 | Richert | G06T 7/593 348/135 |
| 2016/0014426 A1* | 1/2016 | Richert | H04N 19/51 375/240.16 |
| 2016/0100165 A1* | 4/2016 | Zhao | H04N 19/124 375/240.03 |
| 2017/0177085 A1* | 6/2017 | Sun | G06F 3/016 |

* cited by examiner

METHOD AND DEVICE FOR ENCODING/DECODING A PACKET COMPRISING DATA REPRESENTATIVE OF A HAPTIC EFFECT

This application claims the benefit, under 35 U.S.C. § 119 of European Patent Application No. 15305789.8, filed May 26, 2015.

1. TECHNICAL FIELD

The present disclosure relates to the domain of haptics. The present disclosure is also understood in the context of haptic effect(s) of any kind, e.g. motion, vibration, rendered by using one or more actuators, associated with immersive audio-visual content.

2. BACKGROUND ART

According to the background art, it is known to combine haptics and audio-visual content to increase the feeling of immersion while watching the audio-visual content. Such a combination of haptics and audio-visual content is known under the acronym HAV, standing for haptics-audio-visual. MPEG-V architecture is one formalization of the workflow for producing, distributing and rendering HAV content. The MPEG-V standard describes "sensory effects" which includes haptic effects but also gustatory and olfactory effects. The MPEG-V standard proposes a high-level description of haptic effects, which doesn't allow taking into account every human perceptual specificity or specificity of the audio-visual content. Moreover, the MPEG-V standard may encapsulate redundant or useless data, thus consuming too much bandwidth.

3. SUMMARY

The purpose of the present disclosure is to overcome at least one of these disadvantages.

The present disclosure relates to a method of encoding a packet comprising data representative of a haptic effect, the haptic affect being associated with an immersive content, the method comprising:
  adding a first information in the packet, the first information being representative of a dependency of a description of the haptic effect with regard to a position of a body model in relation to the immersive content;
  adding a second information in the packet, the second information being representative of at least a first part of the body model targeted by the haptic effect.

The present disclosure also relates to a device for encoding a packet comprising data representative of a haptic effect, the haptic affect being associated with an immersive content, the device comprising a processor configured to:
  add a first information in the packet, the first information being representative of a dependency of a description of the haptic effect with regard to a position of a body model in relation to the immersive content;
  add a second information in the packet, the second information being representative of at least a first part of the body model targeted by the haptic effect.

According to a particular characteristic, the method further comprises adding a third information in the packet, the third information being representative of a reference position of the body model in relation to the immersive content, the third information being added when the first information indicates that the description of the haptic effect is dependent from the position of the body model.

Advantageously, the data representative of the haptic effect comprises at least a value of intensity of the haptic effect.

The present disclosure also relates to a method of decoding a packet comprising data representative of a haptic effect, the haptic affect being associated with an immersive content, the method comprising:
  obtaining a first information from the packet, the first information being representative of a dependency of a description of the haptic effect with regard to a position of a body model in relation to the immersive content;
  obtaining a second information from the packet, said second information being representative of at least a first part of the body model targeted by the haptic effect.

The present disclosure also relates to a device for decoding a packet comprising data representative of a haptic effect, the haptic affect being associated with an immersive content, the device comprising a processor configured to:
  obtain a first information from the packet, the first information being representative of a dependency of a description of the haptic effect with regard to a position of a body model in relation to the immersive content;
  obtain a second information from the packet, said second information being representative of at least a first part of the body model targeted by the haptic effect.

According to a specific characteristic, the method further comprises obtaining a third information from the packet, the third information being representative of a reference position of the body model in relation to the immersive content, the third information being obtained when the first information indicates that the description of the haptic effect is dependent from the position of the body model.

Advantageously, the method further comprises determining at least a second part of the body model receiving the haptic effect according to the second information and the third information when the position of the body model is different from the reference position.

According to a specific characteristic, the determining comprises deforming the body model according to a current position of the body model and the third information, the at least a second part being determined based on the deformed body model.

According to a specific characteristic, the data representative of the haptic effect comprises at least a value of intensity of the haptic effect The present disclosure also relates to a signal carrying at least a packet comprising data representative of an haptic effect, the haptic affect being associated with an immersive content, the signal further carrying a first information representative of a dependency of a description of the haptic effect with regard to a position of a body model in relation to the immersive content and a second information representative of at least a first part of the body model targeted by the haptic effect The present disclosure also relates to a computer program product comprising program code instructions to execute the steps of the encoding method, when this program is executed on a computer.

The present disclosure also relates to a computer program product comprising program code instructions to execute the steps of the decoding method, when this program is executed on a computer.

The present disclosure also relates to a (non-transitory) processor readable medium having stored therein instructions for causing a processor to perform at least the above-mentioned method of encoding and/or decoding a packet.

4. LIST OF FIGURES

The present principles will be better understood, and other specific features and advantages will emerge upon reading the following description, the description making reference to the annexed drawings wherein.

Figure 1A:
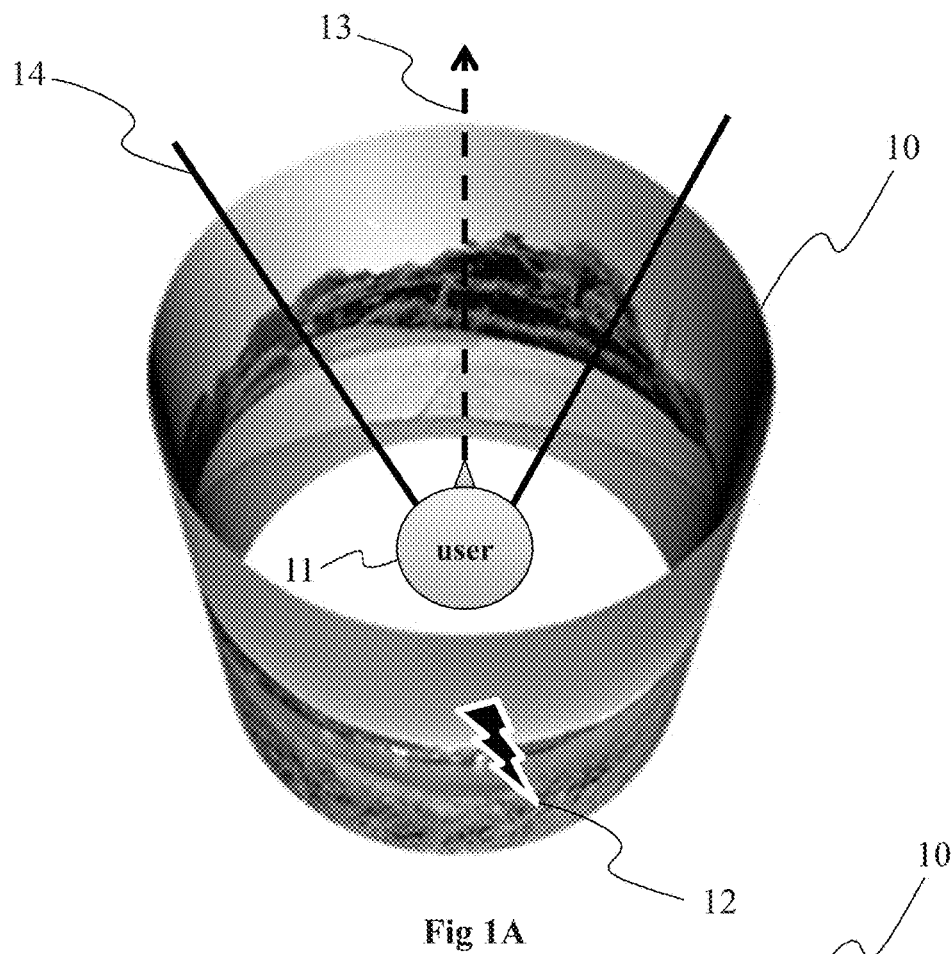
FIGS. 1A and 1B show an immersive audio-visual content and associated haptic effect, according to a particular embodiment of the present principles.
Figure 1B:
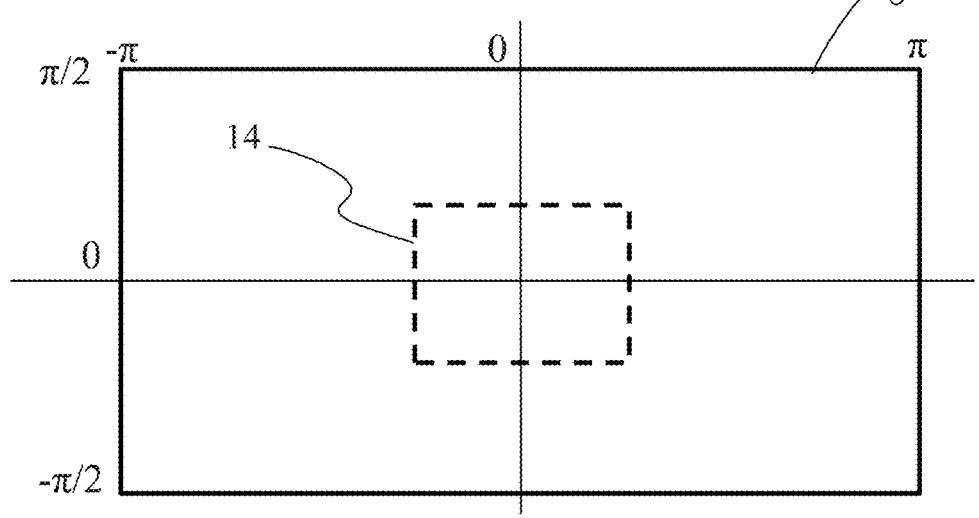
Figure 4A:
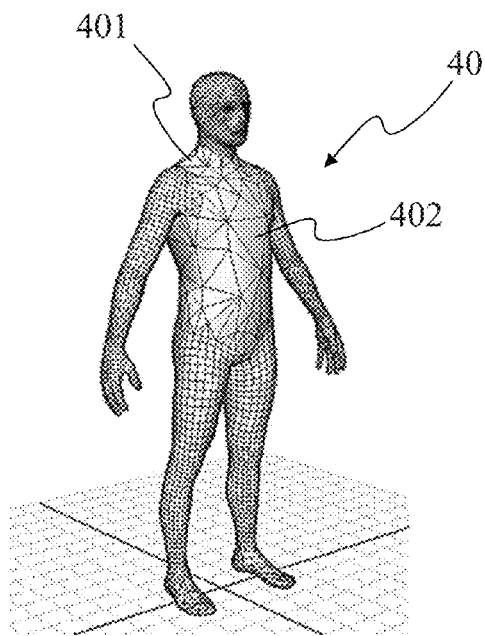
Figure 4B:
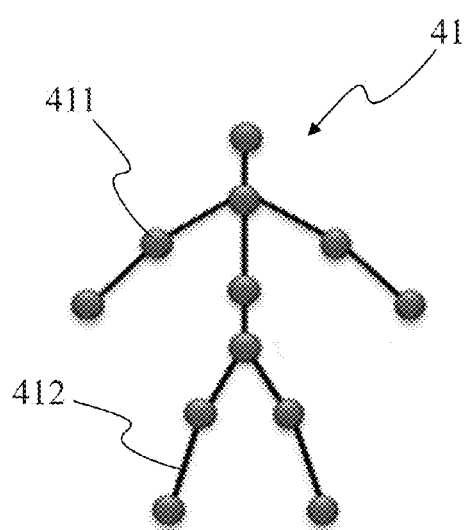
Figure 5:
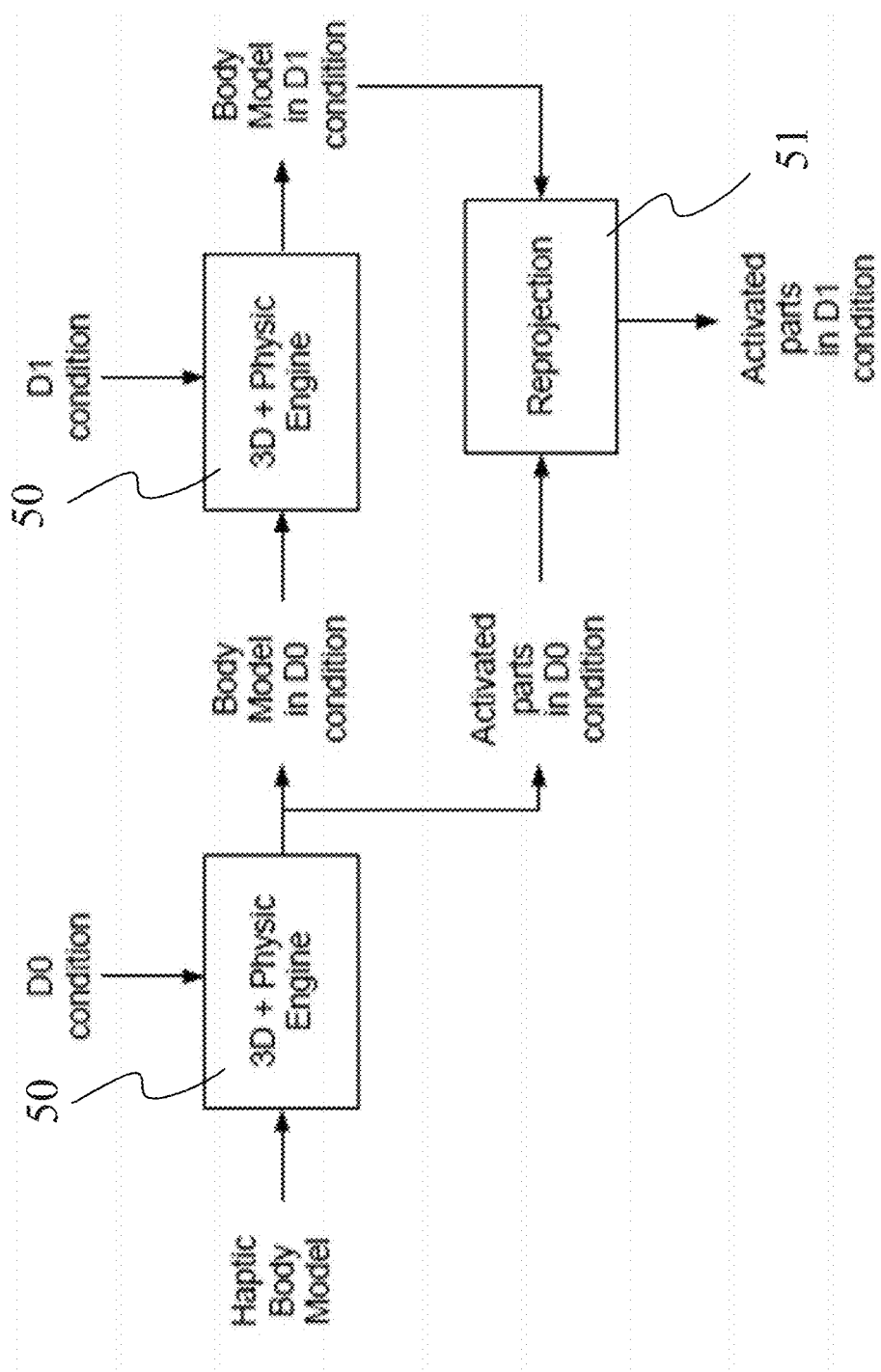
Figure 6:
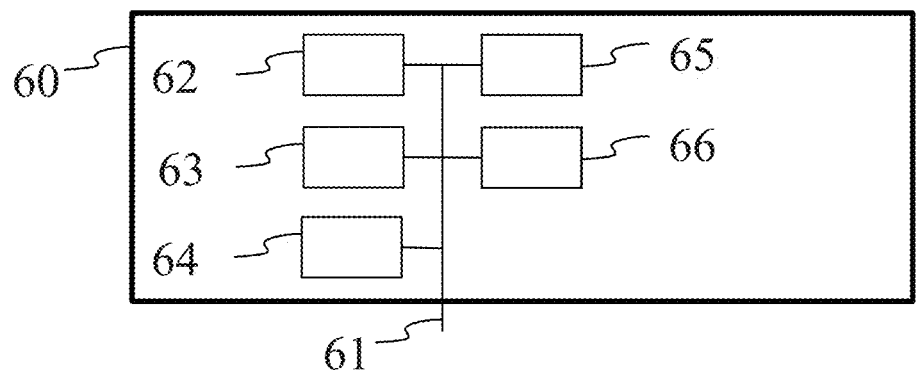
Figure 7:
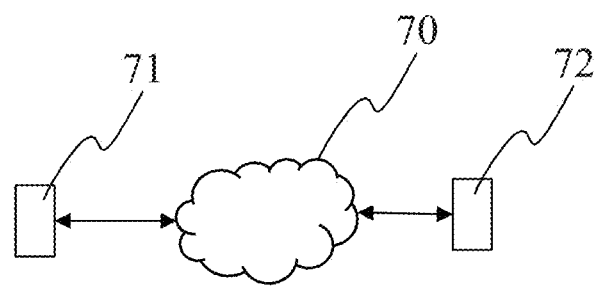
Figure 8:
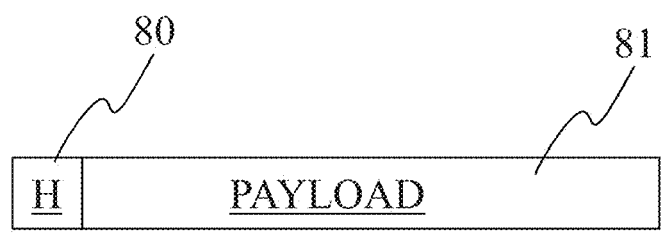
Figure 9:
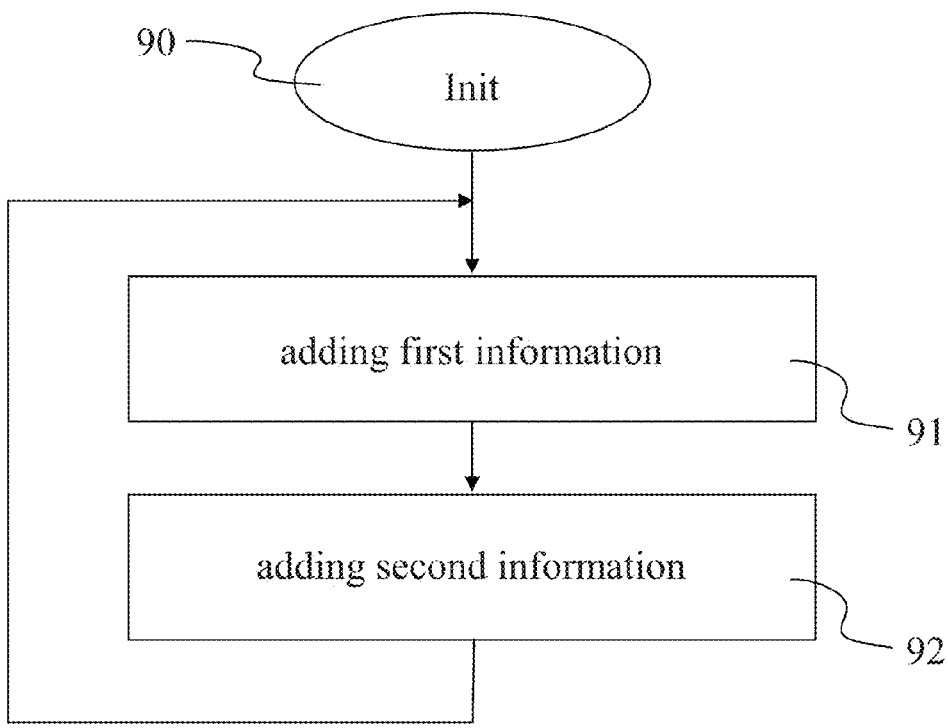
Figure 10:
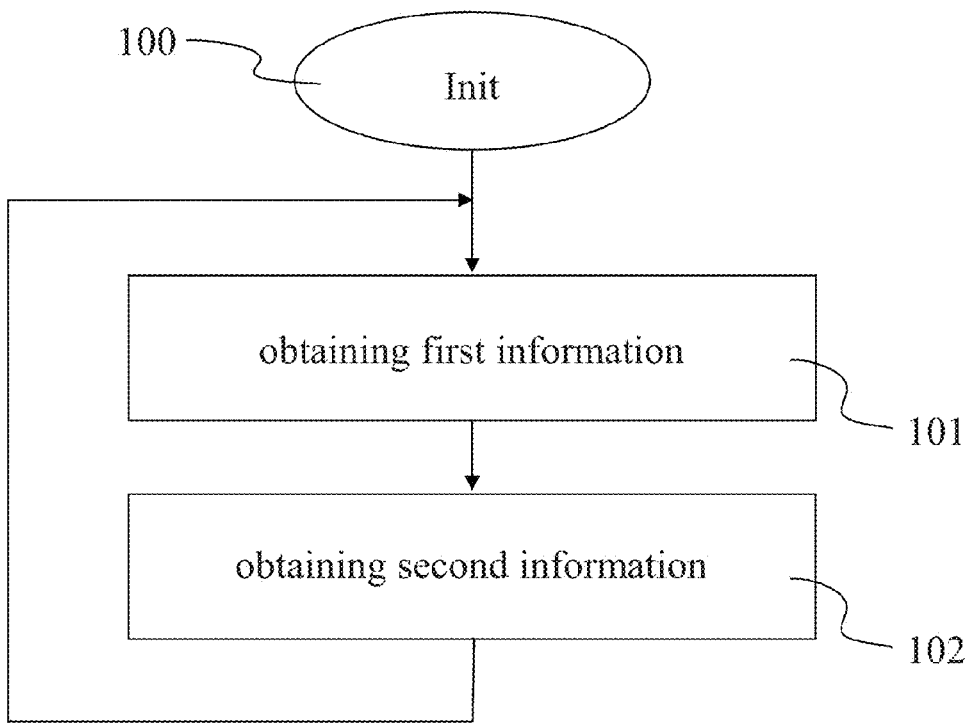

FIGS. 4A and 4B each shows an example of a body model used for determining the parts impacted by the haptic effect associated with the immersive audio-visual content of FIGS. 1A, 1B, according to particular embodiments of the present principles;

FIG. 5 diagrammatically shows a process for determining which part(s) of the body model of FIG. 4 is (are) impacted by the haptic effect associated with the immersive audio-visual content of FIGS. 1A, 1B, according to a particular embodiment of the present principles;

FIG. 6 shows an example of an architecture of a device configured for encoding and/or decoding a packet comprising data representative of the haptic effect associated with the audio-visual content of FIGS. 1A, 1B, in accordance with an example of the present principles;

FIG. 7 shows two remote devices of FIG. 6 communicating over a communication network, in accordance with an example of the present principles;

FIG. 8 shows the syntax of a signal carrying a description of the haptic effect of FIG. 1A, in accordance with an example of the present principles;

FIG. 9 shows a method of encoding a packet comprising data representative of the haptic effect associated with the audio-visual content of FIGS. 1A, 1B, according to a particular embodiment;

FIG. 10 shows a method of decoding a packet comprising data representative of the haptic effect associated with the audio-visual content of FIGS. 1A, 1B, according to a particular embodiment;

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present principles will be described in reference to a particular embodiment of a method of encoding or decoding a packet comprising data representative of a haptic effect. It is understood with haptic effects mechanical stimulation of parts of the body of a user, by applying for example tactile or motion effects by applying forces and vibrations on parts of the body of the user. The haptic effects are advantageously associated with an immersive audio-visual content and enable the user to feel immersed into the audio-visual content while watching it.

FIGS. 1A and 1B show a user 11 immersed in a 47 steradian video content 10 (or spherical video content), also called immersive content 10, according to a particular and non-limitative embodiment of the present principles. FIG. 1A corresponds to a 3D representation of the immersive content. FIG. 1B corresponds to a planar representation of the immersive content 10. The immersive content 10 corresponds for example to a real scene acquired with one or more cameras or to a virtual scene synthesized by using a 3D engine. According to a variant, the immersive content 10 corresponds to a representation of a real scene including virtual object(s), i.e. a blending of real and virtual scenes. As illustrated in FIG. 1, the user 11 is watching at a part of the immersive content according to a viewing direction 13, the viewing direction 13 corresponding to the main direction of the gaze of the user 11. A body model is advantageously associated with the user. A field of view 14 is associated with the viewing direction 13, the field of view 14 corresponding to a part only of the immersive content 10. When the gaze direction of the user 11 changes, the part of the immersive content seen by the user (and corresponding to the field of view) changes consequently. The user 11 may wander its gaze within the immersive content by for example moving his/her head (or his/her body or a part of it) from left to right (or inversely) and/or from top to bottom (or inversely). One or more haptic effect(s) 12 is (are) advantageously associated with the immersive content. In the example of FIG. 1A, the source of the haptic effect 12 is located in the back of the user. The haptic effect may be of any kind, for example a heat source, a vibration source.

Naturally, the location of the source of the haptic effect is not limited to the example of FIG. 1A. The source of the haptic effect may be located at any point of the immersive content 10 but also on the user 11 himself/herself (for example a spider moving on an arm of the user).

The haptic effect is rendered on the user by the way of one or more actuators associated with the user, for example worn by the user (such as vibrating actuators such as for example a watch), or in contact with part(s) of the body of the user (for example actuators moving the part of the body with which they are in contact), or remote from the user (for example a heat source).

The immersive system used to visualize the immersive content is for example a HMD (Head-Mounted Display), worn on the head of the user or as part of a helmet. The HMD advantageously comprises one or more display screens (for example LCD (Liquid Crystal Display), OLED (Organic Light-Emitting Diode) or LCOS (Liquid Crystal On Silicon)) and sensor(s) configured for measuring the change(s) of position of the HMD, for example gyroscopes or an IMU (Inertial Measurement Unit), according to one, two or three axes of the real world (pitch, yaw and/or roll axis). The part of the immersive content 10 corresponding to the measured position of the HMD is advantageously determined with a specific function establishing the relationship between the point of view associated with the HMD in the real world and the point of view of a virtual camera associated with the immersive content 10. Controlling the parts of the video content to be displayed on the display screen(s) of the HMD according to the measured position of the HMD enables a user wearing the HMD to browse into the immersive content, which is larger than the field of view associated with the display screen(s) of the HMD. For example, if the field of view offered by the HMD is equal to 110° (for example about the yaw axis) and if the immersive content offers a content of 180°, the user wearing the HMD may rotate his/her head to the right or to the left to see the parts of the video content outside the field of view offered by the HMD. According to another example, the immersive system is a CAVE (Cave Automatic Virtual Environment) system, wherein the immersive content is projected onto the walls of a room. The walls of the CAVE are for example made up of rear-projection screens or flat panel displays. The user may thus browse his/her gaze on the different walls of the room. The CAVE system is advantageously provided with cameras acquiring images of the user to determine by video processing of these images the gaze direction of the user. According to a variant, the gaze or the pose of the user is determined with a tracking system, for example an infrared tracking system, the user wearing infrared sensors.

Naturally, the immersive content 10 is not limited to a 4π steradian video content but extends to any video content (or audio-visual content) having a size greater than the field of view 14. The immersive content may be for example a 2π, 2.5 π, 3π steradian content and so on.

Figure 2:
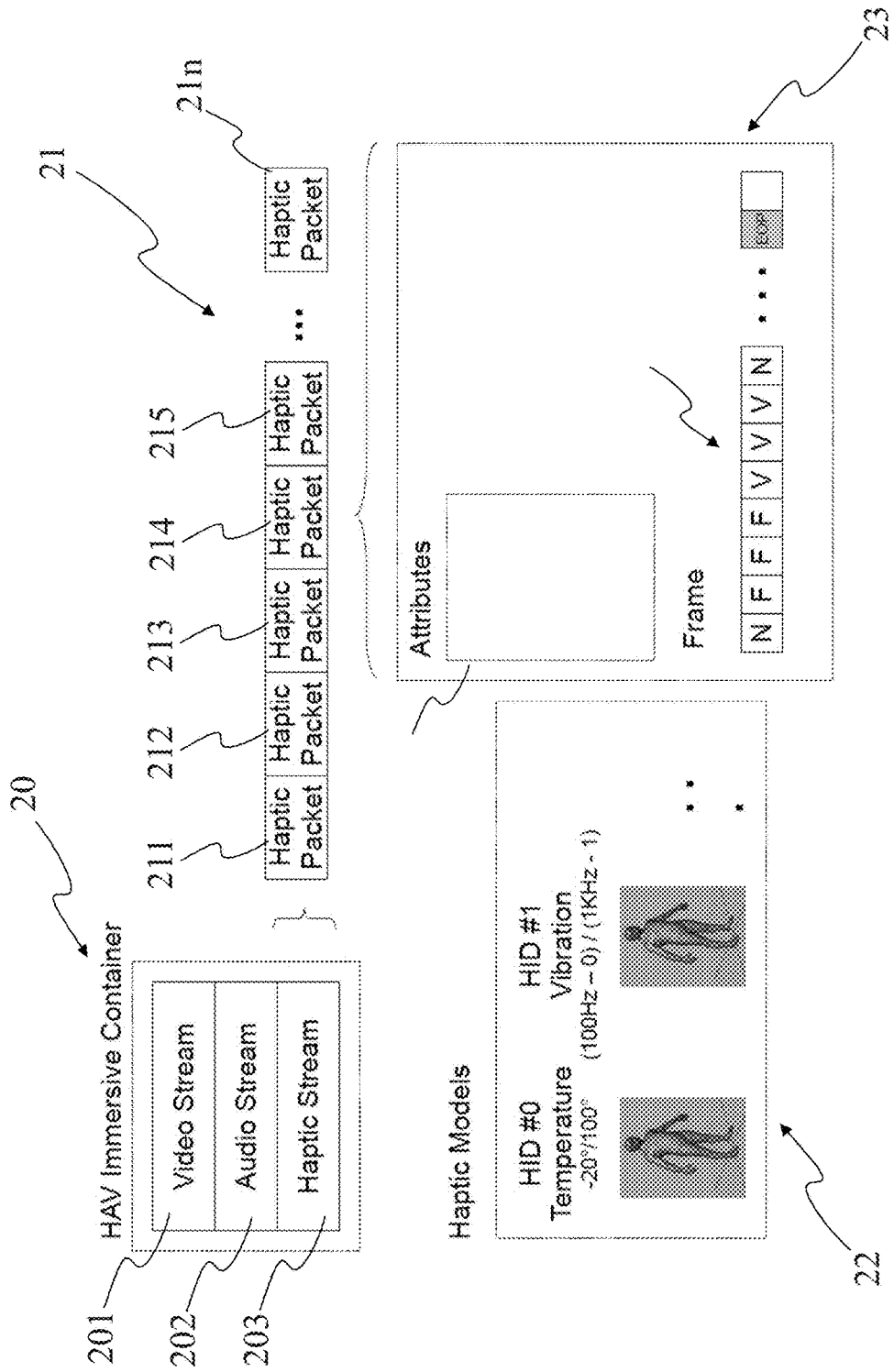
FIG. 2 shows a haptic data stream associated with the immersive audio-visual content of FIGS. 1A, 1B, according to a particular embodiment of the present principles.

FIG. 2 shows a HAV bitstream 20, according to a particular and non-limitative embodiment of the present principles. The HAV bitstream 20 comprises for example a video stream 201, an audio stream 202 and a haptic stream 203. The format of the video stream 201 may be for example MPEG-2, H.264 or MPEG-4, the format of the audio stream may be for example MP3 or AAC (Advance Audio Coding). The streams 201 to 203 are for example wrapped in a container 20, for example a Matroska container (MKV), a 3GP container, an ASF (Advanced Systems Format) container. One skilled in the art can appreciate that the present principles are compatible with other types of formats and containers, including those known currently and those developed in the future.

The haptic stream comprises one or more haptic packets 211 to 21n, a haptic packet being a packet comprising data representative of a haptic effect, n being an integer greater than or equal to 1. The haptic packet 214 is detailed in part 23 of FIG. 2. The haptic packet 214 advantageously comprises a set of attributes 231 and payload data 232. The set of attributes advantageously comprises a first information representative of the dependency of the description of the haptic effect with regard to the position of the body model in relation to the immersive content, a close relationship existing between the position of the body model and the position of the user 11 represented by the body model he/she is associated with. The first information corresponds for example to a Boolean specifying whether the description of the haptic effect depends on the position of the body model. The value '0' may be used for example to indicate that there is no dependency between the description of the haptic effect and the position of the body model in relation to the immersive content. The value '1' may be used for example to indicate that there is dependency between the description of the haptic effect and the position of the body model in relation to the immersive content. To illustrate in which case the description of an haptic effect may be dependent from the position of the body model, let's consider two different examples of haptic effects: i) a temperature effect which represents the heat increase on the part(s) of the body model oriented toward an explosion that occurs in the immersive content, and ii) a vibration effect that should be applied on a part of the body model, for example the forearm, to simulate a spider climbing on its forearm. It is clear that the first effect (i.e. the temperature effect) is highly dependent on the position of the body model with regard to the immersive content: if the body model is watching in the direction of the explosion, it should feel the temperature increase in front of it, whereas if the body model is watching in the opposite direction, it should feel it on his back. In addition, if the arm of the body model is moved to protect its head from the heat increase, the part(s) impacted by the first effect will change. By contrast, the second effect (i.e. the vibration effect) is not dependent from the position as the parts of the body model "feeling" or receiving the effects of the haptic effect will always be the same (the forearm in the example), whatever the position of the body model in relation to the immersive content. Indeed, in the case of the second effect, the frame of reference is the body model itself whereas in the case of the first effect, the frame of reference is out of the body model, which explains that the description of the first effect depends on the position of the body model and not the description of the second effect. It is understood with position of the body model the posture of the body model (or equivalently the posture of the user it is associated with). A change of position corresponds to the change of position in the space of at least a part of the body model, for example a movement of a hand, a rotation of the hand which may be expressed by a change of the coordinates of this moving part in the space.

Advantageously, the set of attributes also comprises the identification, called HID, of the haptic body model associated with the type of the haptic effect to be rendered on the user. Indeed, a different (haptic) body model may be advantageously defined for each type of haptic effect to be rendered, for example a (haptic) body model for temperature effect, with for example HID #0, a (haptic) body model for vibratory effect, with for example HID #1, a (haptic) body model for pressure effect, with for example HID #2, a (haptic) body model for movement effect, with for example HID #3, etc. Data used to define the set of body models 22 are advantageously stored on a server that may be accessed by the device used to create the haptic effect but also by the devices used to render the haptic effect, on the end-user side. According to a variant, the data used to define the set of a body model are stored locally on each device used to create and render the haptic effect. Parts of the data used to define the haptic body models 22 may depend on the type of body model used for the haptic body models 22 (two such types of body models being described with regard to FIGS. 4A and 4B). For example, a body model may be defined with a skeleton including elements such as joints and segments and/or with mesh elements for the skin. Each element may be advantageously described and identified with an element ID for each haptic body model. The mesh used to define the skin may also be different from one haptic body model to another one depending on the haptic effect is associated with. For example, the mesh resolution of the hands of the haptic body model #0 may be higher than the mesh resolution of the hands of the haptic body model #1. Other data used to define each haptic body model may be also associated with each haptic body model, such as a range listing the admissible values for the type of haptic effect it is associated with (for example min/max values, e.g. −20°/100° C. for the temperature effect). Using HID in the haptic packet enables a reduction in the amount of data to be transmitted as it avoids transmitting the data used to define the haptic body model the haptic packet referred to, thus reducing the burden of bandwidth.

According to a variant, the set of attributes also comprises a third information representative of a reference position of the body model in relation to the immersive content. The reference position corresponds advantageously to the position of the body model when the part(s) of the body model receiving the effect of the haptic source corresponds to the first part(s) targeted by the haptic effect. Such a third information is added to the haptic packet as an attribute only when the first information indicates that there is dependency between the description of the haptic effect and the position of the body model. The third information enables one to obtain the position of the body model for which the targeted first part(s) would be effectively impacted by the haptic effect when rendering it. The third information is also useful to determine which part(s), called second part(s), of the body model would be effectively impacted by the haptic effect when the body model is in a current position different from the reference position, knowing the current position.

According to a variant, the third information is always added to the haptic packet, whatever the value of the first information, '0' or '1'.

The third information may take the form of a position attribute defining the position for which the haptic effect is designed in the payload data 232 of the haptic packet. The position attribute may be for example an identifier identifying a given posture (e.g. seated, standing, lying,). According to a variant, the third information corresponds to the mesh and/or skeleton of the haptic body model in the reference position.

The payload data 232 of the haptic packet advantageously comprises a data array (also called "frame") of size S that may be for example a fixed value. The data array comprises the effective haptic values to transfer. Each frame contains a burst of complete haptic samples (one haptic packet may contain several successive full haptic samples sampled at a frequency that may be set in the attributes for example, in addition to the first and third information, or that may be set in the data associated with the haptic body model).

Each haptic sample comprises a second information representative of the part(s) of the body model targeted by the haptic effect, called first part(s). The second information corresponds for example to the number 'N' of first parts of the body model associated with the haptic packet that should be affected by this haptic effect. The second information may also comprise identifiers (F) identifying each first part of the body model targeted by the haptic effect, i.e. each element of the body model impacted or feeling the effect of the haptic effect, the identifiers 'F' making reference to the elements described in the data used to define each haptic body model 22. Each haptic sample further comprises the list of haptic effect values 'V' (intensities) associated with the N first parts, each value may be scalar or vectorial (for a vibration, a couple frequency/intensity may be used), each value being for example normalized between 0 and 1 according to a range specified in the associated haptic body model 22. According to an optional variant, the payload data may comprise an end of packet (EOP) identifier (for example the unsigned integer 0xFFFF) that may be added at the end of the useful data if the full data array is not used.

FIGS. 4A and 4B each show a body model used to define the haptic body models 22 and represent the user 11 watching at the immersive content 10, according to two particular and non-limitative embodiments of the present principles.

FIG. 4A illustrates a first exemplary body model 40 comprising a mesh of mesh elements, e.g. polygons 401, 402, called faces. Each face is advantageously with an identifier that may be used to identify the mesh elements impacted by a haptic effect. As illustrated on FIG. 4A, the density of the mesh elements may vary according to the part of the body model. The faces are for example denser on the hands than on the forearm, denser on the head than on the torso. According to a variant, the density of the mesh elements may further vary according to the type of haptic effect (e.g. tactile, temperature, vibrations), meaning that a different body model maybe used for a different haptic effect.

FIG. 4B illustrated a second exemplary body model 41 corresponding to a simplified user's body model represented with joints 401 and segments 402. For example, arms are considered as two segments (arm and forearm) and two joints (elbow and shoulder). The neck is composed of one segment and one joint. The size of the segments and angle limits of joints are advantageously defined by anatomical data, as described for example in "*General Anatomy and Musculoskeletal System*" by M. Schuenke, E. Schulte, U. Schumacher, L. M. Ross, E. D. Lamperti and M. Voll (Thieme Medical Publishers Inc., 2010).

Naturally, the body model is not limited to the exemplary body models 40 and 41 but extends to any body model. The body model may for example comprise a more accurate representation of the human skeleton (size and weight of bones, constraints on the joints) and/or comprise a representation of the muscles. A more detailed body model will enable the computation of more realistic haptic feedback. For example the propagation of the vibrations in the human body may take care of the bone density and the damping properties of the muscles.

Figure 3:
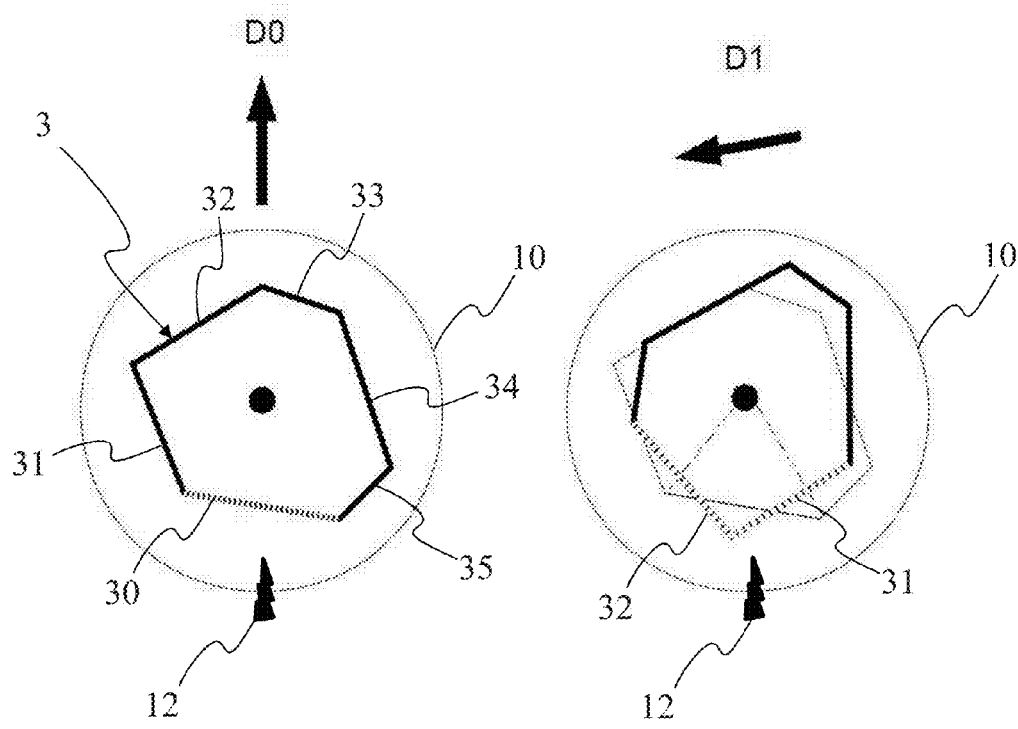
FIG. 3 shows parts of a body model impacted by a haptic effect associated with the immersive audio-visual content of FIGS. 1A, 1B, according to a particular embodiment of the present principles.

FIG. 3 shows parts of a body model impacted by the haptic effect 12 according to two different orientations of the body model 3, according to a particular and non-limitative embodiment of the present principles. The left-hand part of FIG. 3 shows the body model 3 viewing the immersive content according to the reference position, i.e. according to a viewing direction D0 for which the haptic effect 12 has been specifically described. The description of the haptic effect comprises the list of elements (called first parts) of the body model impacted by the haptic effect and the intensity of the haptic effect values for each element impacted by the haptic effect. The elements or parts of the body model illustrated in FIG. 3 are referenced 30, 31, 32, 33, 34 and 35. The first part of the body model impacted by the haptic effect corresponds to the element 30 and is illustrated with a dash line. Naturally, the number of first parts is not limited to 1 but extends to any number greater than or equal to 1.

The right-hand part of FIG. 3 shows the body model viewing the immersive content according to a position (called current position) different from the reference position, i.e. according to a viewing direction D1. Naturally, the source of the haptic effect 12 is still at the same position in the immersive content 10. As the current position of the body model 3 is different from the reference position for which the haptic effect is described, the part of the body model impacted by the haptic effect 12, called a second part, being different from the first part 30. In this example, the second part is comprised of more than one second part corresponding to the elements referenced 31, 32, i.e. the elements facing at least in part the source of the haptic effect 12. The second parts are different from the first part as the frame of reference of the haptic effect is out of the body model (user) in this example.

The position of the body model 3 is advantageously determined from the position of the associated user 11. The position (or posture) of the user 11 may be determined from data measured by the sensors of the HMD when the user wears an HMD. If a CAVE system is used, the position may be determined by image processing of images of the face of the user in the CAVE system or from data generated by a tracking system tracking the pose and/or the motion of the user within the CAVE system.

To avoid adding the information with regard to the part(s) of the body model impacted by the haptic effect according to each and every possible position of the body model, a process to determine the second part(s) will be described with regard to FIG. 5. By avoiding transmitting information with regard to the part(s) of the body model impacted by the haptic effect according to each and every possible position of the body model, bandwidth can be reduced.

Naturally, a change of position of the body model (or of the user) is not limited to a change of viewing direction of the immersive content by the user but extends to any change of posture of any part of the body model, for example a movement of a part of the body model, a rotation of a part of the body model, etc.

FIG. 5 shows a process for determining the second part(s) of the body model 3 impacted by the haptic effect 12, according to a particular and non-limitative embodiment of the present principles.

In a first step, the haptic body model of the type associated with the type of haptic effect to be rendered (for example haptic body model #1 for vibratory effect) is initialized, i.e. deformed, to be in a position corresponding to the reference position D0 and in the condition associated with the haptic effect to be rendered. The input of the 3D+physics engine 50 performing the first step are the haptic body model identified with the HID and the condition associated with the D0 position, i.e. the reference position and the haptic effect to be rendered (location of the source of the haptic effect for example). The output of the first step is a deformed haptic body model in the position D0 and the first parts of the haptic body model identified.

In a second step, the haptic body model in position D0 is deformed to be in the position D1. The position D1 is derived from the measured changed of position of the user associated with the body model. Such a step is also performed by the 3D+physics engine 50 with for input the haptic body model in position D0 and the current position D1. A deformed haptic body model in position D1 is obtained at the output of the 3D+physics engine 50. The deformation may correspond to a simple rotation of the body model in the current position D1, i.e. to a rotation of one or more elements forming the body model, according to a first example. This first example is especially appropriate in the case where the user only change his/her gaze direction, without other movement of the body. According to a second example, a mechanical/physical model is used to infer the deformation of the haptic body model according to the difference between the position D1 and the position D0. The second example is advantageous in the case of movement of part(s) of the user more complex than in the first example or gives more realistic result than the first example in the case the user only changes his/her gaze.

In a third step, the second parts of the haptic body model really impacted by the haptic effect are determined according to the deformed haptic body model in the position D1 and according to the first parts. To that aim, the first parts are for example projected onto the deformed haptic body model in position D1. The second parts then correspond to the projection of the first parts onto the deformed haptic body model in position D1. The effect intensities are transferred (and possibly interpolated if needed) from the first parts to the second parts.

According to a variant, the first and second steps are combined. The haptic body model in position D1 is obtained by deforming the haptic body model at the input of the first step by taking into consideration the difference between the D1 position and the D0 position.

FIG. 6 shows an exemplary architecture of a device 6 which may be configured to implement a method described in relation with FIGS. 9 and/or 10.

The device 6 comprises following elements that are linked together by a data and address bus 61:
- a microprocessor 62 (or CPU), which is, for example, a DSP (or Digital Signal Processor);
- a ROM (or Read Only Memory) 63;
- a RAM (or Random Access Memory) 64;
- a storage interface 65;
- an I/O interface 66 for reception of data to transmit, from an application; and
- a power supply 67, e.g. a battery.

In accordance with an example, the power supply 67 is external to the device. In each of mentioned memory, the word «register» used in the specification can correspond to area of small capacity (some bits) or to very large area (e.g. a whole program or large amount of received or decoded data). The ROM 63 comprises at least a program and parameters. The ROM 63 may store algorithms and instructions to perform techniques in accordance with present principles. When switched on, the CPU 62 uploads the program in the RAM and executes the corresponding instructions.

The RAM 64 comprises, in a register, the program executed by the CPU 62 and uploaded after switch on of the device 6, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the first, second and/or third information are obtained from a source. For example, the source belongs to a set comprising:
- a local memory (63 or 64), e.g. a video memory or a RAM (or Random Access Memory), a flash memory, a ROM (or Read Only Memory), a hard disk;
- a storage interface (65), e.g. an interface with a mass storage, a RAM, a flash memory, a ROM, an optical disc or a magnetic support;
- a communication interface (66), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s), the first, second and/or third information are sent to a destination; specifically, the destination belongs to a set comprising:
- a local memory (63 or 64), e.g. a video memory or a RAM, a flash memory, a hard disk;
- a storage interface (65), e.g. an interface with a mass storage, a RAM, a flash memory, a ROM, an optical disc or a magnetic support; and
- a communication interface (66), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, the bitstream 20 is sent to a destination. As an example, the bitstream 20 is stored in a local or remote memory, e.g. a video memory (64) or a RAM (64), a hard disk (63). In a variant, the bitstream is sent to a storage interface (65), e.g. an interface with a mass storage, a flash memory, ROM, an optical disc or a magnetic support and/or transmitted over a communication interface (66), e.g. an interface to a point to point link, a communication bus, a point to multipoint link or a broadcast network.

In accordance with examples of decoding or decoder, the bitstream 20 is obtained from a source. Exemplarily, the bitstream is read from a local memory, e.g. a video memory (64), a RAM (64), a ROM (63), a flash memory (63) or a hard disk (63). In a variant, the bitstream is received from a storage interface (65), e.g. an interface with a mass storage, a RAM, a ROM, a flash memory, an optical disc or a magnetic support and/or received from a communication interface (65), e.g. an interface to a point to point link, a bus, a point to multipoint link or a broadcast network.

In accordance with examples, the device 6 is configured to implement an encoding method described in relation with FIG. 9, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

In accordance with examples, the device 6 is configured to implement a decoding method described in relation with FIG. 10, and belongs to a set comprising:
- a mobile device;
- a communication device;
- a game device;
- a set top box;
- a TV set;
- a tablet (or tablet computer);
- a laptop;
- a display (such as a HMD for example), and
- a decoding chip.

In accordance with an example illustrated in FIG. 7, in a transmission context between two remote devices 71 and 72 (of the type of the device 60) over a communication network NET 70, the device 71 comprises means which are configured to implement a method for encoding an picture as described in relation with the FIG. 9, and the device 72 comprises means which are configured to implement a method for decoding as described in relation with FIG. 10.

In accordance with an example, the network 70 is a LAN or WLAN network, adapted to broadcast still pictures or video pictures with associated audio information and haptic information from device 71 to decoding devices including the device 72.

A signal, intended to be transmitted by the device 71, carries the bitstream 20. The bitstream 20 comprises an encoded haptic packet as explained before. This signal further comprises first, second and/or third information data as described with regard to FIG. 2.

FIG. 8 shows an example of an embodiment of the syntax of such a signal when the data are transmitted over a packet-based transmission protocol. Each transmitted packet P comprises a header H 80 and a payload PAYLOAD 81. A bit of the header H, for example, is dedicated to represent the first information data indicating the dependency of the description of the haptic effect with regard to the orientation of the body model (or equivalently the user represented by the body model) in relation to the immersive content. The second and third information are for example transmitted in the payload 81. According to a variant, the first, second and third information are comprised in the payload 81.

FIG. 9 illustrates a method for encoding a packet comprising data representative of a haptic effect to be rendered implemented in a device 6 configured for encoding, according to a non-restrictive embodiment of the present principles.

During an initialisation step 90, the different parameters of the device 6 are updated. In particular, the data representative of the haptic effects to be rendered are initialised in any way.

Then during a step 91, a first information is added to the packet. The first information is representative of the dependency of the description of the haptic effect with respect to the position of the body model used to model/represent a user in relation to the immersive content is added to the packet. The description of the haptic effect comprises notably the type of the haptic effect and according to the type of the haptic values an array of values of intensity of the effects (force, temperature, pressure, movement) to be applied to the body model/user. If the frame of reference of the haptic effect is the body model/user then there is no dependency between the description of the haptic effect and the position of the body model. If the frame of reference of the haptic effect is out of the body model/user, then there is dependency between the description of the haptic effect and the position of the body model.

Then during a step 92, a second information is added to the packet. The second information is representative of the first part(s) of the body model that is (are) targeted by the haptic effect. A part of the body model corresponds to one of the element forming the body model, for example a joint or a segment when the body model comprises a skeleton, for example a mesh element (e.g. a polygon) when the body model comprises a mesh, for example a skin mesh. The first information corresponds for example to an identifier, an identifier being associated with each element (or part) of the body model. It is understood with "first part(s) targeted by the haptic effect" the part(s) of the body model onto which would be applied the intensities of the effect when the body model is in a determined position, called reference position, when the first information indicates that there is dependency between the description of the haptic effect and the position of the body model. If there is no dependency, then the first part(s) correspond to the elements of the body model onto which will be applied the haptic effect, whatever the position of the body model.

In a third optional step, a third information is added to the packet. The third information is representative of a reference position of the body model in relation to the immersive content. The reference position corresponds to the determined position, i.e. the position wherein the haptic effect will be effectively applied on the first parts. The third information is for example added only when the first information indicates that there is dependency between the description of the haptic effect and the orientation of the body model. According to a variant, the third information is always added to the packet, whatever the meaning of the first information.

Adding the first information enables to reduce the amount of data to be added to the packet, at least when the first information indicates that there is no dependency. On the rendering side, the first information also reduces the amount of data to be decoded, at least when the first information indicates that there is no dependency. Indeed, in such a case, there is no need to decode/transmit the third information, nor any information about the position of the body model.

In a further optional step, the packet is transmitted.

In a further optional step, the data comprised in the packet is transformed into a haptic effect applied to at least one body part of the user according to the first, second and/or third information.

FIG. 10 illustrates a method for decoding a packet comprising data representative of an haptic effect to be rendered implemented in a device 6 configured for decoding, according to a non-restrictive embodiment of the present principles.

During an initialisation step 90, the different parameters of the device 6 are updated. In particular, the data representative of the haptic effects to be rendered and received previously are initialised in any way.

Then during a step 91, a first information is obtained, i.e. extracted and/or decoded, from the received packet, the packet being for example received via a wireless connection or via a wired connection. The packet is for example received from an encoding device 6 or from a remote storage device of from a local storage device comprised in the decoding device 6.

Then during a step 92, a second information is obtained, i.e. extracted and/or decoded, from the received packet.

In a third optional step, a third information is obtained, i.e. extracted and/or decoded, from the received packet. The third information is advantageously obtained only when the first information indicates that there is dependency between the description of the haptic effect and the orientation of the body model, which enables to reduce the amount of data to be obtained when the first information indicates that there is no dependency.

In a further optional step, the second part(s) of the body model impacted by the haptic effect is (are) determined, at least when the first information indicates that there is dependency. The second parts are determined based on the body model that has been deformed using the third information and an information representative of a current position of the body model, different from the reference position.

In a further optional step, the haptic effect is rendered on a user by controlling actuators according to the data comprised in the decoded packet.

Naturally, the present disclosure is not limited to the embodiments previously described.

In particular, the present disclosure is not limited to a method for encoding/decoding a packet comprising haptic data but also extends to any device implementing this method and notably any devices comprising at least one CPU and/or at least one GPU.

The present disclosure also relates to a method (and a device configured) for generating haptic effects and to a method (and a device configured) for rendering haptic effects.

The present disclosure also relates to a method (and a device configured) for transmitting and/or receiving the packet comprising haptic data.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding data representative of a haptic effect, said haptic effect being associated with an immersive content, wherein the method comprises:
    obtaining a first information representative of whether said haptic effect depends on an orientation of a model in relation to said immersive content, said model being representative of at least a part of a body of a user;
    obtaining a second information identifying at least a first part of said model targeted by said haptic effect;
    obtaining identification of said model (HID) associated with a type of haptic effect to be rendered by the user;
    obtaining a third information representative of a reference orientation of said model in relation to said immersive content, wherein said reference orientation corresponds to the position of the model corresponding to the first part of said model targeted by said haptic effect, said third information being encoded into said bitstream if said first information indicates that the haptic effect depends on the orientation of said model; and
    encoding said first information, said second information, said identification, and said third information into a bitstream; and transmitting said bitstream.

2. The method according to claim 1, wherein said data representative of the haptic effect comprises at least a value of intensity of the haptic effect.

3. A method of decoding data representative of a haptic effect from a bitstream, said haptic effect being associated with an immersive content, wherein the method comprises:
    receiving said bitstream;
    decoding a first information from said bitstream, said first information being representative of whether said haptic effect depends on an orientation of a model in relation to said immersive content, said model being representative of at least a part of a body of a user;
    decoding a second information from said bitstream, said second information being representative of at least a first part of said model targeted by said haptic effect
    obtaining identification of said model (HID) associated with a type of haptic effect to be rendered on the user;
    obtaining a third information from said bitstream, said third information being representative of a reference orientation of said model in relation to said immersive content, wherein said reference orientation corresponds to the position of the model corresponding to the first part of said model targeted by said haptic effect, said third information being obtained when said first information indicates that the haptic effect depends on the orientation of said model; and
    rendering on the user said haptic effect according to the first information, the second information, said identification, the third information, and data comprised in said bitstream.

4. The method according to claim 3, further comprising determining at least a second part of the model receiving the haptic effect according to said second information and said third information when the orientation of the model is different from the reference orientation.

5. The method according to claim 4, wherein said determining comprises deforming said model according to a current orientation of the model and the third information, the at least a second part being determined based on the deformed model.

6. The method according to claim 3, wherein said data representative of the haptic effect comprises at least a value of intensity of the haptic effect.

7. A device for encoding a packet comprising data representative of a haptic effect, said haptic effect being associated with an immersive content, wherein the device comprises a memory associated with a processor configured to:
    obtain a first information representative of whether said haptic effect depends on an orientation of a model in relation to said immersive content, said model being representative of at least a part of a body of a user;
    obtain a second information identifying at least a first part of said model targeted by said haptic effect;
    obtain identification of said model (HID) associated with a type of haptic effect to be rendered by the user;
    obtain a third information representative of a reference orientation of said model in relation to said immersive content, wherein said reference orientation corresponds to the position of the model corresponding to the first part of said model targeted by said haptic effect, said third information being obtained if said first information indicates that the haptic effect depends on the orientation of said model; and
    encode said first information, said identification, said second information, and said third information into a bitstream; and transmit said bitstream.

8. The device according to claim 7, wherein said data representative of the haptic effect comprises at least a value of intensity of the haptic effect.

9. A device for decoding data representative of a haptic effect from a bitstream, said haptic effect being associated with an immersive content, wherein the device comprises a memory associated with a processor configured to:
    receive said bitstream;
    decode a first information from said bitstream, said first information being representative of whether said haptic effect depends on an orientation of a model in relation to said immersive content, said model being representative of at least a part of a body of a user;

decode a second information from said bitstream, said second information identifying at least a first part of said model targeted by said haptic effect;

obtain identification of said model (HID) associated with a type of haptic effect to be rendered on the user;

obtain a third information from said bitstream, said third information being representative of a reference orientation of said model in relation to said immersive content, wherein said reference orientation corresponds to the position of the model corresponding to the first part of said model targeted by said haptic effect, said third information being obtained when said first information indicates that the haptic effect depends on the orientation of said model; and render on the user said haptic effect according to the first information, the second information, said identification, the third information, and data comprised in said bitstream.

10. The device according to claim 9, said processor being further configured to determine at least a second part of the model receiving the haptic effect according to said second information and said third information when the orientation of the model is different from the reference orientation.

11. The device according to claim 10, said processor being further configured to determine a deformation of said model according to a current orientation of the body model and the third information, the at least a second part being determined based on the deformed body model.

12. The device according to claim 9, wherein said data representative of the haptic effect comprises at least a value of intensity of the haptic effect.

13. A non-transitory processor readable medium having stored therein instructions for causing a processor to perform the encoding method according to claim 1.

14. A non-transitory processor readable medium having stored therein instructions for causing a processor to perform the decoding method according to claim 3.

* * * * *